June 24, 1969   J. D. MEADOR   3,451,268
COOLED THERMOCOUPLE
Filed May 18, 1967

INVENTOR.
Jay D. Meador
Paul Fitzpatrick
ATTORNEY

United States Patent Office 3,451,268
Patented June 24, 1969

3,451,268
COOLED THERMOCOUPLE
Jay D. Meador, Indianapolis, Ind., assignor to General Motors Corporation, Detroit, Mich., a corporation of Delaware
Filed May 18, 1967, Ser. No. 639,464
Int. Cl. G01k 1/08
U.S. Cl. 73—343                                    4 Claims

ABSTRACT OF THE DISCLOSURE

A thermocouple measures motive fluid temperature in the inlet of a gas turbine. The thermocouple junctions are mounted in a through gas passage within the body of the thermocouple. The body is double-walled and circulates cooling air from the combustion chamber jacket of the engine within the body wall into the motive fluid duct, the cooling fluid being particularly circulated through the portions of the wall subject to direct impingement by the stream of motive fluid.

---

The invention herein described was made in the course of work under a contract or subcontract thereunder with the Department of Defense.

My invention relates to devices for measuring the temperature of hot flowing gases and particularly to the measurement of turbine inlet temperature in a gas turbine engine. It is customary in gas turbine engines to provide thermocouples to measure the temperature of the motive fluid. While such thermocouples may be installed downstream of the turbine, it is preferred for accurate measurement and control to install them upstream of the turbine where the gas is hottest. Progressive development of gas turbine engines in recent years has been accompanied by a progressive increase in the temperature of the motive fluid. Accurate control of temperature thus becomes even more vital to the longevity of the engine, and the increasing temperature makes it increasingly difficult to provide thermocouples or other temperature measuring probes which will have satisfactory service life. Particularly when located in the turbine inlet, the thermocouples are exposed to a very hot fast-moving stream of combustion products in which a large part of the oxygen is uncombined.

Representative thermocouples for use with gas turbines are shown in U.S. patents to Gaubatz, No. 2,806,075 for Thermocouple; to Rademacher, No. 2,888,508 for Thermocouple, and to me, No. 3,011,004 for Thermocouple Design.

A thermocouple according to my invention may be generally of similar construction to those mentioned above but with the addition of means for circulating a cooling fluid through the body of the thermocouple probe, particularly in those areas which are subject to direct impingement by the stream of combustion products. Preferably in such installations the cooling fluid is combustion chamber jacket air circulated between the two walls of a double-walled probe body. By so circulating cooling air and by using high temperature and corrosion resistant alloys for the body of the probe, I have been able to provide a probe capable of very satisfactory endurance in engines at temperatures as high as 2500° F.

The nature of the invention and its advantages will be clear to those skilled in the art from the succeeding description and accompanying drawings of the preferred embodiment of the invention.

Figure 1:
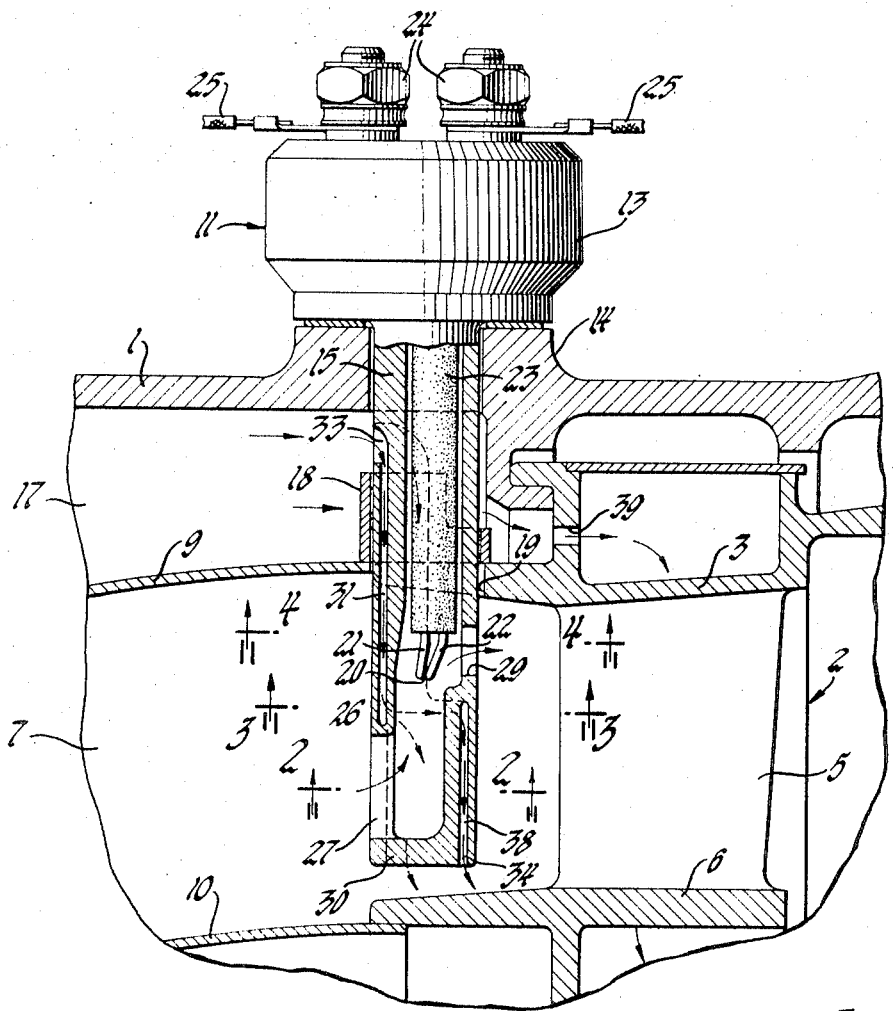

FIGURE 1 is a sectional view of a thermocouple installation in the inlet of a gas turbine.

Figure 2:
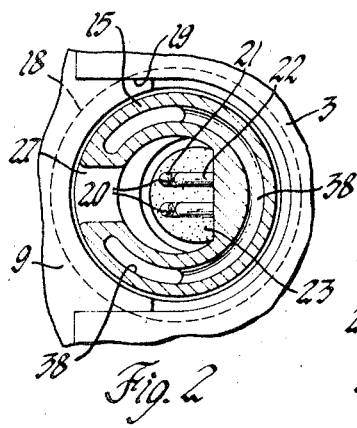
Figure 3:
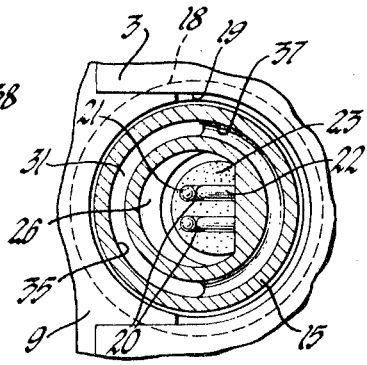
Figure 4:

FIGURES 2, 3, and 4 are transverse sectional views taken on the planes indicated by the lines 2—2, 3—3, and 4—4 in FIGURE 1.

Referring particularly to FIGURE 1, a gas known turbine engine (Allison model 501) embodies a cylindrical outer case 1 within which is mounted an annular segmented turbine nozzle 2.

This nozzle includes an outer shroud 3, vanes 5, and an inner shroud 6, the vanes extending radially of the engine between the shrouds. A combustion products duct 7 through which motive fluid is conducted to the turbine nozzle is defined by the radially outer wall 9 and the radially inner wall 10 of the transition section of the combustion liners of the engine. A temperature sensor 11, specifically a thermocouple, includes a head 13 mounted on a boss 14 extending from the case 1. A generally cylindrical tubular probe or body 15 extends from the head into the combustion products duct 7. This body is preferably a Hastelloy X investment casting with an aluminum diffusion coating. The probe extends across a combustion chamber jacket space 17 which contains compressed air at considerably lower temperature and slightly higher pressure than that in the duct 7. It extends through a floating grommet 18 mounted on the outer wall 9 of the transition section and through a notch 19 in the forward edge of the outer shroud 3, and terminates near the inner shroud 6. Thus, the probe extends radially across the combustion products duct 7 slightly ahead of the turbine nozzle vanes 5. The thermocouple is of a double type having two junctions 20 (FIGURES 1 and 2). Each junction unites two wires 21 and 22 of different materials; in the specific example, these being tips of Platinel 1813 and Platinel 1503, alloys manufactured by Engelhard Industries, welded to leads of alumel and chromel, respectively. Such a thermocouple is the subject of my U.S. patent application Ser. No. 397,859 for Thermocouple System, filed Sept. 21, 1964, now abandoned. These wires are supported and insulated by a ceramic body 23 extending through the body 15 into the head 13, where they are connected to four terminals 24, only two of which are visible in the figure. The terminals 24 provide for connection of the external wiring harness 25 to the thermocouple.

The thermocouple is to some extent a sampling type, the junctions being exposed to motive fluid flowing through a passage 26 extending generally longitudinally of the probe from an entrance slot 27 facing upstream in duct 7 to an exit 29 displaced longitudinally of the probe from the entrance and facing downstream. Because the gas in the duct 7 is traveling at high speed, a current of such gas is rammed through the passage 26 in the probe past the junctions, to expose them to motive fluid temperature. The inner end of the hollow probe is closed, except for a cooling fluid conduit to be described, by an end wall 30.

Proceeding now to the structure which provides for cooling the probe, the body defines a cooling fluid conduit 31 extending lengthwise of the body. This conduit has an inlet 33 between sleeve 15 and wall 1 in the combustion chamber jacket 17 and extends through the walls of body 15 to an outlet 34 at the inner end of the probe adjacent the inner shroud 6. Conduit 31 comprises an initial portion 35 (FIGURE 4) which extends through the portion of the probe from the inlet to adjacent the gas entrance 27, a crossover portion 37 (FIGURE 3) which carries the cooling air from the upstream side of the probe to the downstream side, and a terminal portion 38 of the conduit (FIGURE 2) which lies within the downstream portion of the wall and extends forwardly to adjacent to the entrance 27 as indicated in FIGURE 2. Thus, it will be seen that the forward portion of the probe wall is double within duct 7 and the rear portion of the wall is double and provides for cooling aft of the gas entrance 27. As will be apparent, the hot combustion products impinge most strongly on the forward wall of the probe and on the rearward wall of the probe where it strikes the inside of this wall after entering the entrance 27. Thus, the arrangement of double walls defining the cooling fluid conduit provides for cooling the most highly heated parts of the probe. The circulation of cooling air through the probe is maintained by the slight pressure differential existing between jacket 17 and motive fluid conduit 7. However, a ram effect could be used to insure circulation.

It may be noted that the air in conduit 17 is not stagnant, since it is continuously flowing through dilution holes (not shown) into the combustion liner and also because some of it flows through cooling holes 39 to the outer surface of shroud 3 from which it may flow radially through the hollow vanes 5 and shroud 6.

It will be seen from the foregoing that the cooling air circulation is capable of substantially reducing the temperature of those parts of the probe which are most highly heated by the motive fluid. In fact, it has been found possible to obtain a reasonable service life from probe bodies operated in combustion products ducts where the combustion products temperature is higher than the melting point of the probe metal.

References above to the specific materials of the probe body and thermocouple wires is not intended as limiting, but merely to illustrate preferred materials for extreme high temperature use. The cooling system may be used with various refractory or high temperature alloys and may also be used with less resistant alloys in order to extend their use to temperature ranges which would otherwise be impossible with such materials.

The description of the preferred embodiment of the invention for the purpose of explaining the principles thereof is not to be considered as limiting or resistricting the invention, since many modifications may be made by the exercise of skill in the art.

I claim:
1. A temperature-measuring installation comprising, in combination,
   a first duct for conducting a fluid the temperature of which is to be measured,
   a second duct containing a fluid at lower temperature than the fluid in the first duct,
   a probe including a tubular body extending from within the second duct into the first duct,
   the body defining interiorly thereof a passage for the fluid within the first duct, the passage having an upstream directed entrance and a downstream directed exit, the entrance and exit being within the first duct and being offset transversely of the direction of flow in the first duct from each other,
   temperature-measuring means disposed within the passage so as to be exposed to the fluid therein,
   the body defining a cooling fluid conduit within the body externally of the said passage,
   the conduit having an outlet in the first duct and an inlet in the second duct,
   the conduit extending within the downstream wall of the body in the area downstream of the said entrance and extending within the upstream wall of the portion of the body within the first duct outside the area of the said entrance,
   and means for causing fluid to flow from the second duct to the first duct through the conduit.

2. An installation as defined in claim 1 in which the first duct is a combustion products duct leading from a combustion chamber, and
   the second duct is a combustion chamber jacket.

3. An installation as defined in claim 1 in which the said outlet is in the end wall of the probe.

4. A temperature-measuring installation in a gas turbine engine comprising, in combination,
   a combustion products duct,
   a compressed air duct alongside the combustion products duct,
   a temperature probe mounted so as to extend into the combustion products duct from within the compressed air duct,
   the temperature probe having a tubular outer wall terminating in a closed end within the combustion products duct,
   the wall having two openings within the combustion products duct displaced lengthwise of the probe communicating with the interior of the probe, the openings defining an entrance and an exit for combustion products respectively on the upstream and downstream sides of the probe with respect to direction of flow of the combustion products,
   temperature-sensing means within the probe between the entrance and exit,
   the said tubular outer wall having a double-walled structure defining a coolant conduit within the wall,
   the conduit extending through the upstream side of the wall except in the area of the combustion products entrance and extending through the downstream side of the wall in the area of the combustion products entrance,
   the conduit originating in an entrance within the compressed air duct and terminating in an outlet within the combustion products duct.

References Cited

UNITED STATES PATENTS 2,975,225  3/1961  Barbieri _____ 136—233

LOUIS R. PRINCE, *Primary Examiner.*

DENIS E. CORR, *Assistant Examiner.*

U.S. Cl. X.R.

73—359